United States Patent
Crouse

(10) Patent No.: US 10,116,502 B2
(45) Date of Patent: Oct. 30, 2018

(54) SYSTEM AND METHOD FOR PROVIDING CONFIGURATION SETTINGS TO SERVICES IN A CLOUD INFRASTRUCTURE

(71) Applicant: salesforce.com, inc., San Francisco, CA (US)

(72) Inventor: Steven Joseph Crouse, Halifax (CA)

(73) Assignee: salesforce.com, inc., San Francisco, CA (US)

(*) Notice: Subject to any disclaimer, the term of this patent is extended or adjusted under 35 U.S.C. 154(b) by 291 days.

(21) Appl. No.: 15/051,366

(22) Filed: Feb. 23, 2016

(65) Prior Publication Data

US 2017/0244598 A1   Aug. 24, 2017

(51) Int. Cl.
G06F 15/16 (2006.01)
H04L 12/24 (2006.01)
H04L 29/08 (2006.01)

(52) U.S. Cl.
CPC .......... *H04L 41/0806* (2013.01); *H04L 67/10* (2013.01)

(58) Field of Classification Search
CPC .............................. H04L 41/0806; H04L 67/10
USPC .................................................. 709/203–248
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |

(Continued)

OTHER PUBLICATIONS

Information Society Technologies, DBGlobe: A Data Centric approach to Global Computing, 2002, p. 6.*

*Primary Examiner* — Moustafa M Meky
*Assistant Examiner* — Thorne E Waugh
(74) *Attorney, Agent, or Firm* — Lorenz & Kopf, LLP

(57) ABSTRACT

Computer systems and methods are provided for storing configuration settings for services that are provided in a cloud infrastructure in a central database, and providing values for those configuration settings to services in the cloud infrastructure when those services request a configuration setting.

17 Claims, 9 Drawing Sheets

(56) References Cited

U.S. PATENT DOCUMENTS

| | | |
|---|---|---|
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,558,857 B2 * | 7/2009 | Ammerlaan .......... G06F 9/5061 709/208 |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,210,178 B1 * | 12/2015 | Roth .................... H04L 63/105 |
| 9,614,685 B2 * | 4/2017 | Lehtovirta ............. H04L 12/00 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 * | 10/2004 | Barnes Leon .... G06F 17/30569 |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2015/0222679 A1 * | 8/2015 | Bhatia ............... G06F 17/30516 709/213 |

* cited by examiner

SYSTEM AND METHOD FOR PROVIDING CONFIGURATION SETTINGS TO SERVICES IN A CLOUD INFRASTRUCTURE

TECHNICAL FIELD

Embodiments of the subject matter described herein relate generally to computer systems and methods for accessing configuration settings at services within a cloud infrastructure, and more particularly to systems and methods for storing configuration settings for services of a cloud infrastructure in a central database and providing values for those configuration settings to services in the cloud infrastructure when services request those configuration settings.

BACKGROUND

Software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application feature software between multiple sets of users.

The infrastructure in a typical cloud computing environment can include thousands of servers including redundant versions of same server spread out geographically. Each server can host at least one service. A database is typically associated with each server and stores properties files for each one of the services hosted by its associated server. Each properties file includes a number of configuration settings for a specific service provided by that server. Each configuration setting includes a property name and a value associated with that property name. It is necessary to synchronize, maintain, and update configuration settings for these servers on a regular basis. If a change is made to a configuration setting, that change needs to propagate out to all the servers. Given the large number of servers that are part of the cloud computing environment this is a highly manual and error prone process.

Systems and methods are thus needed which overcome the foregoing shortcomings.

BRIEF DESCRIPTION OF THE DRAWING FIGURES

A more complete understanding of the subject matter may be derived by referring to the detailed description and claims when considered in conjunction with the following figures, wherein like reference numbers refer to similar elements throughout the figures.

DETAILED DESCRIPTION

Embodiments of the subject matter described herein generally relate to systems and methods for storing configuration settings for services of a cloud infrastructure in a central database and providing values for those configuration settings to services in the cloud infrastructure when services request those configuration settings. In accordance with the disclosed embodiments, configuration settings stored in the "flat" properties files for all of the various services that make up a cloud infrastructure can be extracted and imported into a hierarchical configuration setting structure that is stored in a single location as a centralized database. The hierarchical configuration setting structure includes configuration settings from each of the flat properties files arranged in a hierarchal order to simplify management of the configuration settings. A server then provides a single centralized service that can be accessed by all downstream services of the cloud infrastructure to access their respective configuration settings that are stored in the hierarchical configuration setting structure.

Figure 1:
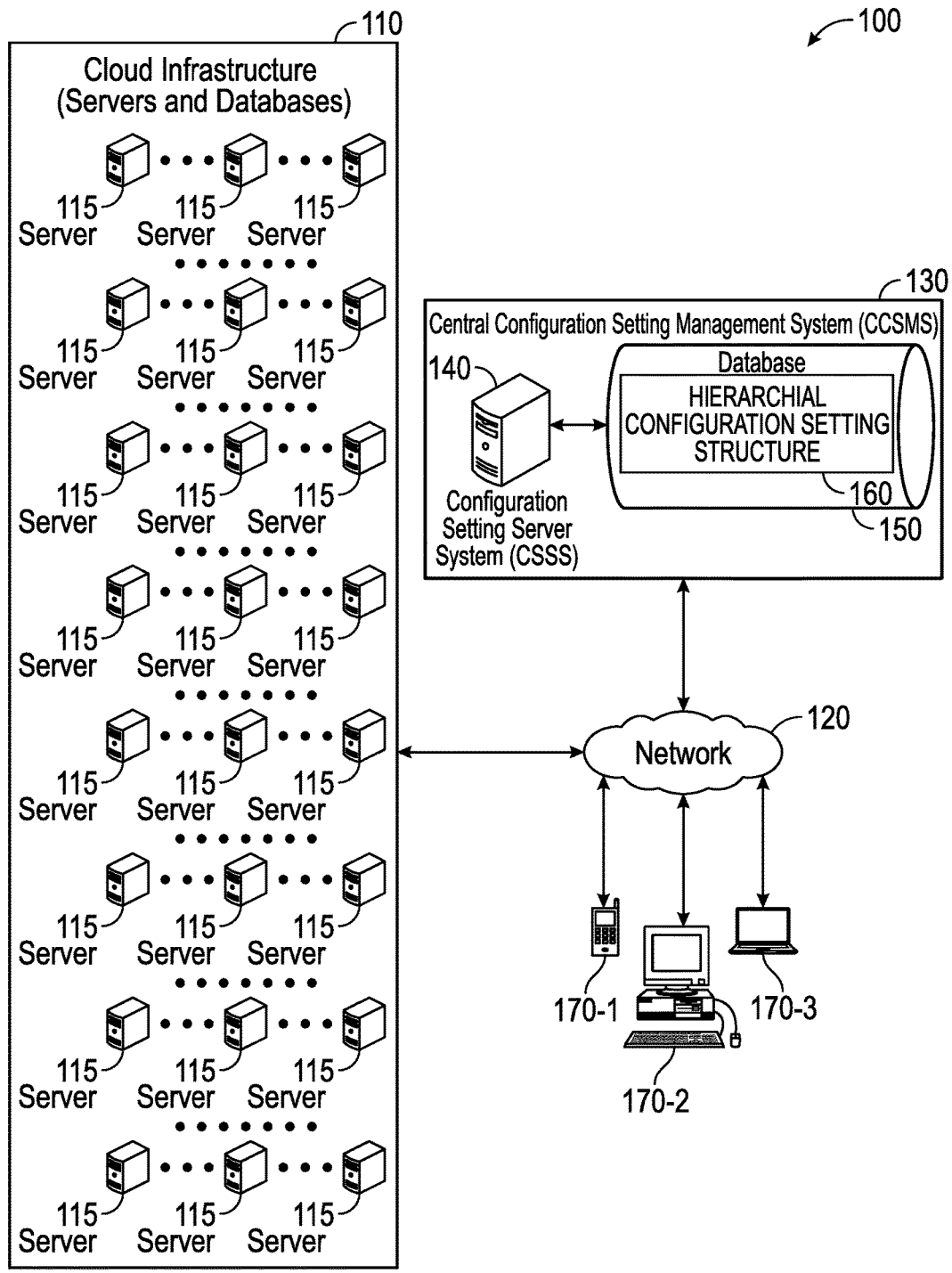
FIG. 1 is a schematic block diagram of a cloud computing environment in accordance with an embodiment.

FIG. 1 is a schematic block diagram of a cloud-based computing system 100 in accordance with an embodiment. FIG. 1 and the following discussion are intended to provide a brief, general description of one non-limiting example of a computing system in which the embodiments described herein may be implemented. Those skilled in the art will appreciate that the embodiments described herein may be practiced with other computing systems.

The cloud-based computing system 100 includes cloud infrastructure 110, a network 120, a central configuration setting management system (CCSMS) 130 and client devices 170.

The cloud infrastructure 110 includes a number of servers 115. Each of the servers 115 is also referred to herein as "first servers" to distinguish them from the server 140 that is part of the CCSMS 130. Although the cloud infrastructure 110 illustrates twenty-four servers 115 to illustrate an example, it should be appreciated that the cloud infrastructure 110 can include any number of server machines that individually or jointly execute instructions to provide applications and services to the client devices 170. For example, some implementations can include hundreds or even thousands of servers and associated databases. Although not depicted in FIG. 1, the servers 115 that make up the cloud infrastructure 110 can be used to implement a very large number of server clusters.

Each server 115 can host one or more services or applications. As used herein, an application refers to software that a user accesses over a network (e.g., Internet) via a web browser executed by a client. As used herein, a service refers to a system of software that allows different machines to interact with each other through a network. Although there are distinctions between applications and services, for sake of simplicity, those two terms will be used interchangeably herein, and are simply referred to as services throughout this document.

Although not illustrated in FIG. 1 for sake of simplicity, each of the servers 115 includes one or more processing systems (also referred to as a processor herein), and a non-transitory computer-readable storage media encoded with computer-executable instructions that, when loaded into the processing system, may transform the computer system from a general-purpose computing system into special-purpose computer capable of hosting one or more services or applications that can be accessed by client devices 170. The computer-executable instructions may be encoded on the computer-readable storage medium by altering the electrical, optical, magnetic, or other physical characteristics of particular locations within the media.

In addition, although not illustrated, each server 115 has a database associated with it that can be either part of the same physical hardware or a separate component. In a conventional cloud infrastructure 110, each database stores at least one properties file for each one of the services hosted by its associated server. For example, in one conventional implementation, each server 115 can maintain and store a "flat" properties file for each particular service it hosts although in some cases multiple properties files can be stored for each specific service hosted by a particular server. Each properties file is stored in a common location (i.e., common across all servers) and tends to have a common format. Each properties file includes a number of configuration settings for a specific service provided by that server. Each configuration setting includes a property name and a value associated with that property name. In other words, a configuration setting is a combination of a property name and a value, associated with that property name, that specifies a setting for that property. A simplified example of a properties file could be:

File: application.properties
    redis.server.url=https://fake.redis.com
    redis.server.port=443
    user.database.connection.string=jdbc://user.database.com/Users
    max.threadpoolsize=50
    min.threadpoolsize=3

It should be understood that a typical properties file would include many more configuration settings, and that this example is provided to illustrate the general format of configuration settings. In this example, the redis.server.port=443 would be one of the configuration settings, where "redis.server.port" is the property name and "443" is the value associated with that property name. The structure or format of each properties file is "flat" meaning that the configuration settings that make up each properties file for a particular service have no structure, arrangement, relationship with respect to each other. When a configuration setting is needed, the service will access the properties file, find the property name and read the value of that configuration setting.

In the cloud-based computing system 100, any number of client devices 170 can communicate with the servers 115 over the network 120 to access applications and services hosted by the servers 115 that are part of the cloud infrastructure 110. The client devices 170 can be computers such as desktop computers, laptop computers, tablet computers, smartphones, etc. Some of the client devices 170 can be used by users such as system administrators, site reliability engineers, and development operations engineers who are collectively responsible for the health of cloud-based services provided by the cloud-based computing system 100.

The cloud infrastructure 110 in a typical cloud computing environment can include thousands of servers 115 including redundant versions of same server that are spread out geographically. All of the various configuration settings need to be kept up-to-date and synchronized properly across all of the servers 115 making it necessary to synchronize, maintain, and update these servers 115 on a regular basis. For example, system administrators are tasked with managing and maintaining properties files that are stored locally on each of the server. It is still a highly manual and error prone process to try and maintain the configuration settings of properties files at each of the individual servers. Each server needs to have a full copy of all the configuration settings necessary for it to operate. If a change is made to a configuration setting, that change needs to propagate out to all the servers. In addition, although the content of each properties file can be very similar, it can differ depending, for example, on the environment, the role of service or the bank that service is associated with or part of, etc.

In a conventional cloud infrastructure 110, an administrator is responsible for manually managing and maintaining the properties files and the various configuration settings that make up each properties file. These tasks can include, for example, updating the properties file any time a configuration setting is added, deleted or modified. However, one drawback of storing the properties files directly on each server is that this can create a daunting management/maintenance task when the cloud infrastructure 110 includes hundreds or thousands of servers. The tasks of managing and maintaining (e.g., updating, synchronizing, etc.) numerous configuration settings across each of these properties files becomes even more time consuming as the number of servers and services in a cloud infrastructure increases. There tends to be significant numbers of "redundant" configuration settings that are duplicated across multiple services, and all of these configuration settings need to be kept synchronized. When the value of a particular configuration setting is modified, it then becomes a difficult manual process to find all of the duplicated configuration settings and update them across all of the properties files. As such, it would be desirable to provide methods and systems that can help eliminate the need to store properties files locally at each server, and that can help streamline management of these properties files.

In accordance with the disclosed embodiments, the CCSMS 130 is provided that includes a configuration setting server system (CSSS) 140 and a database 150. Depending on the implementation, the database 150 can either be part of the CSSS 140 or coupled to the CSSS 140. For example, the database 150 can be co-located in the same enclosure as the CSSS 140 or located in an external housing that is coupled to the CSSS 140. As such, in one embodiment, the database 150 can be implemented as part of the CSSS 140. In another embodiment, the CSSS 140 and the database 150 are separate components that are communicatively coupled to each other.

To make each of the services that are provided by each of the servers 115 identifiable, a service key is defined for each service, which allows each service to be identified by the service key that is defined for that particular service. Each service key includes a number (N) of identifiers that are used to identify that service, where N is an integer greater than or equal to two. As will be explained below, the service keys allow for configuration settings to be broken down into a logical structure. As will be explained below, in one embodiment, an N-level service key will result in an M-level hierarchy that includes $0^{th}$ through Nth levels. Each configuration setting can be assigned within that hierarchy to produce a hierarchical configuration setting structure (HCSS) 160 that is stored in the database 150. The HCSS 160 that is configured to store configuration settings for each of the services of the cloud infrastructure in a hierarchal configuration that has a hierarchy of M levels, where M is an integer greater than or equal to three in one embodiment.

In accordance with the disclosed embodiments, the CCSMS 130 obtains at least one flat properties file from each server 115. Depending on the implementation, the CSSS 140 can either pull the properties files from each server 115, or each server 115 can push their respective properties files to the CSSS 140.

Once the CSSS 140 obtains those flat properties files for each service within the cloud infrastructure, the CSSS 140 processes configuration settings in each properties file to extract a hierarchy of configuration settings and generate the HCSS 160 that is stored in the database 150. For example, the CSSS 140 extracts the configuration settings from each properties file for processing, determines an appropriate level within a hierarchy of the configuration settings that each configuration setting is to be assigned to, and writes each of the configuration settings to the appropriate level within the hierarchy of the configuration settings to generate the HCSS that is stored in the database 150 of the CCSMS. The HCSS 160 can then be used to retrieve values of configuration settings each time one of the servers 115 requests a configuration setting using, for example, a service key associated with that service that logically identifies the service, and a property name of the configuration setting. As such, the database 150 serves as a central aggregation point that allows all of the services provided by the cloud infrastructure 110 to request configuration settings. The properties files and their associated configuration settings no longer need to be spread across numerous servers throughout the cloud infrastructure 110, and redundant duplicate configuration settings can be consolidated at the HCSS 160 to address the problem of redundancy. This HCSS 160 also vastly reduces complexity and results in a system that is much easier to manage and maintain. This approach also reduces potential errors that can occur when managing the configuration settings since only a single source needs to be managed, and any changes to a common configuration setting only need to be made once. For example, when the HCSS 160 applies an update to one of the configuration settings, based on the property name of the configuration setting and the service key that is associated with that configuration setting, that update can be applied to more than one of the services of the cloud computing environment. For instance, if multiple services were using a common shared configuration setting to retrieve the connection information for a particular database, updating this single configuration setting would allow all such services to retrieve the new updated value.

Figure 2:
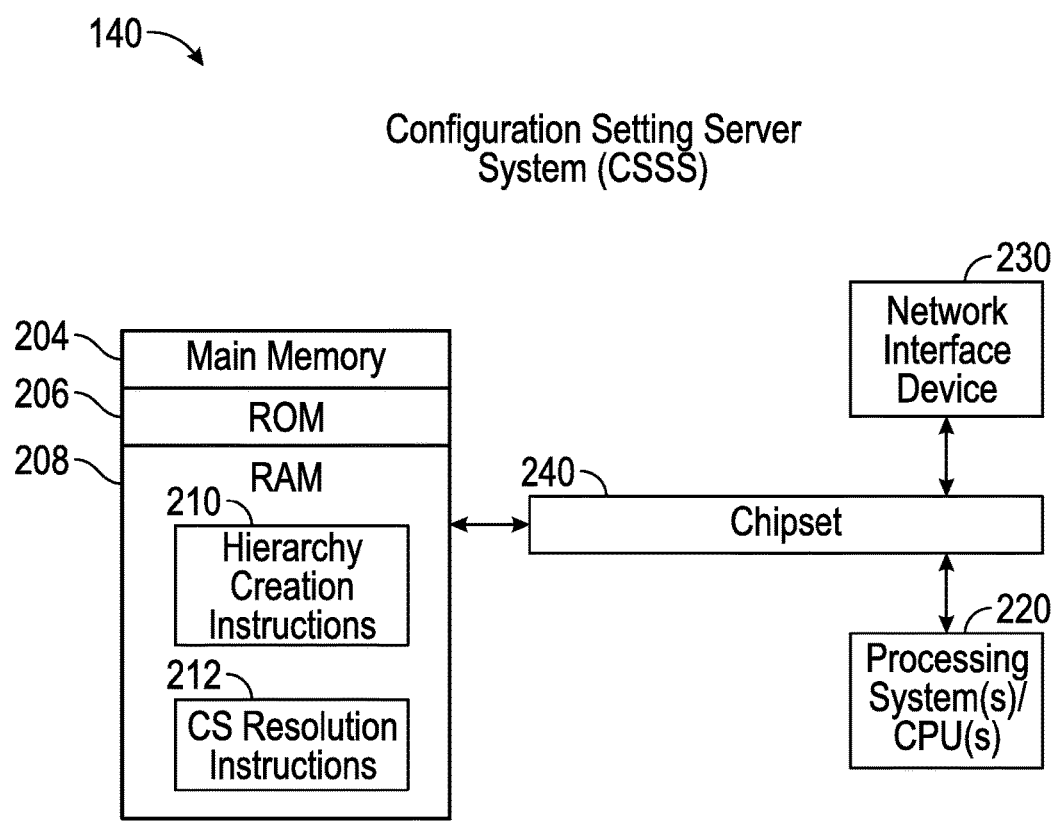
FIG. 2 is a schematic block diagram of a configuration setting server (CSSS) in accordance with an embodiment.

FIG. 2 is a schematic block diagram of a configuration setting server system (CSSS) 140 that is part of the CCSMS 130 in accordance with an embodiment. FIG. 2 will be described with reference to FIG. 1.

The CSSS 140 can include a main memory 204, one or more processing system(s) 220, a network interface device (NID) 230, and a chipset 240. It will be appreciated that the CSSS 140 may not include all of the components shown in FIG. 2, may include other components that are not explicitly shown in FIG. 2, or may utilize an architecture completely different than that shown in FIG. 2. For example, the CSSS 140 may also include other input and output devices that are not illustrated in FIG. 2 for sake of simplicity.

The chipset 240 is usually located on a motherboard of the server 115. The chipset 240 is a set of electronic components (e.g., in an integrated circuit) that interconnects and manages the data flow between the processing system(s) 220 and other elements of the server 115 and any peripherals, such as the database 150, that are connected to the server 115. For instance, the chipset 240 provides an interface between the processing system(s) 220 and the main memory 204, and also includes functionality for providing network connectivity through the NID 230, such as a gigabit Ethernet adapter. The chipset 240 typically contains the processor bus interface (also known as a front-side bus), memory controllers, bus controllers, I/O controllers, etc.

The processing system(s) 220 communicates with main memory 204 and the NID 230 via chipset 240 and appropriate buses. Processing system(s) 220 represents one or more general-purpose processing devices such as a microprocessor, central processing unit, or the like. More particularly, the processing system(s) 220 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing system(s) 220 may also be one or more special-purpose processing devices such as an application specific integrated circuit (ASIC), a field programmable gate array (FPGA), a digital signal processor (DSP), network processor, or the like.

The processing system(s) 220 can include one or more central processing units ("CPUs") that operate in conjunction with the chipset 240. The processing system(s) 220 perform arithmetic and logical operations necessary for the operation of the server 115. The processing system(s) 220 can perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The NID 230 is capable of connecting the CSSS 140 to other computers over the network 130. The network 130 can be an Ethernet or Gigabyte Ethernet LAN, a fiber ring, a fiber star, wireless, optical, satellite, a WAN, a MAN, or any other network technology, topology, protocol, or combination thereof. As such, the NID 230 allows the CSSS 140 to be connected (e.g., networked) to other machines in a LAN, an intranet, an extranet, or the Internet. In accordance with the disclosed embodiments, each server 115 (of the cloud infrastructure 110) provides one or more properties files to the CSSS 140 via the NID 230, and each server 115 can communicate requests for configuration settings to the CSSS 140 via the NID 230, and the CSSS 140 can return appropriate configurations settings to each server 115 via the NID 230.

The chipset 240 can provide an interface to various forms of computer-readable storage media including a main memory 204 (e.g., read-only memory (ROM), flash memory, dynamic random access memory (DRAM) such as synchronous DRAM (SDRAM)), and storage devices (not illustrated). The processing system(s) 220 can communicate with the various forms for computer-readable storage media via the chipset 240 and appropriate buses.

The main memory 204 may be composed of many different types of memory components. The main memory 204 can include non-volatile memory (such as read-only memory (ROM) 206, flash memory, etc.), volatile memory (such as random access memory (RAM) 208), or some combination of the two. The RAM 208 can be any type of suitable random access memory including the various types of dynamic random access memory (DRAM) such as SDRAM, the various types of static RAM (SRAM). The main memory 204 (as well as the processing system(s) 220) may be distributed throughout the CSSS 140.

The RAM 208 includes programs/instructions 210, 212, and operating system software (not illustrated) that controls the operation of the CSSS 140 and manages computer hardware and software resources and provides common services for computer programs executed by the processing system(s) 220. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. Regardless of the implementation, the operating system includes many different "components" that make the different parts of the CSSS 140 work together.

The ROM of the main memory 204 can be used to store firmware that includes program code containing the basic routines that help to start up the CSSS 140 and to transfer information between elements within the CSSS 140. The ROM of the main memory 204 may also store other software components necessary for the operation of the CSSS 140 in accordance with the embodiments described herein.

The main memory 304 includes a computer-readable medium on which is stored one or more sets of instructions 210, 212. For example, in one embodiment, the RAM 208 stores instructions 210, 212 or executable code for one or more programs that can be loaded and executed at processing system(s) 220 to cause the processing system(s) 220 to perform various server functions that will be described below. These computer-executable instructions specify how the processing system(s) 220 transition between states to perform various acts described below with reference to FIGS. 3-8. For example, as will be explained below, the processing system(s) 220 of the CSSS 140 can access computer-readable storage media and execute computer-executable hierarchy creation instructions 210 stored therein to cause the CSSS 140 to process the configuration settings from each properties file to generate the HCSS 160. The processing system(s) 220 of the CSSS 140 can access computer-readable storage media and execute computer-executable configuration resolution instructions 212 stored therein to cause the CSSS 140 to resolve a request for a particular configuration setting that is received from one of the servers 115 and respond by returning an appropriate configuration setting that corresponds to that request. Various functions performed by the processing system(s) 220 upon loading and executing the instructions 210, 212 will be described in greater detail with reference to FIGS. 3-8.

Figure 3:
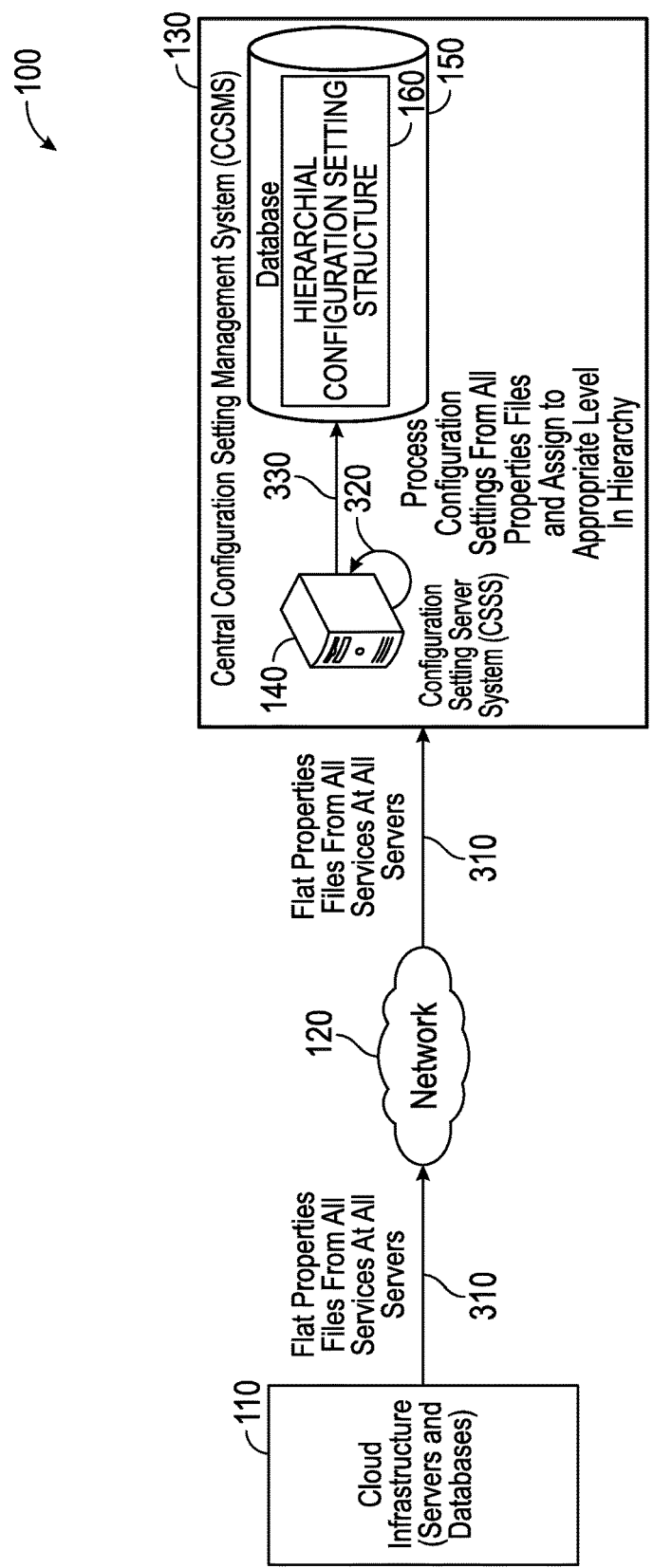
FIG. 3 is a schematic block diagram of the cloud computing environment of FIG. 1 that illustrates processing of properties files communicated from each of the servers in FIG. 1 to generate a hierarchical configuration setting structure (HCSS) in accordance with an embodiment.

FIG. 3 is a schematic block diagram of the cloud computing environment 100 of FIG. 1 that illustrates processing of properties files communicated from each of the servers in FIG. 1 to generate the HCSS 160 in accordance with an embodiment. FIG. 3 will be described with reference to FIGS. 1-2. At 310, each of the servers 115 that are part of the cloud infrastructure 110 communicates their flat properties file(s) that are associated with each of the services over the network 120 to the CSSS 140. At 320, the processing system(s) 220 of the CSSS 140 executes the hierarchy creation instructions 210 to process each configuration setting from each properties file (e.g., to determine its location and arrangement within a hierarchy) and assign that particular configuration setting to an appropriate level within the hierarchy. At 330, the processing system(s) 220 of the CSSS 140 executes the hierarchy creation instructions 210 to write that configuration setting into the HCSS 160 that is stored in the database 150. Once all of the configuration settings from all of the properties files have been processed, the HCSS 160 is complete and ready to be used.

Figure 4:
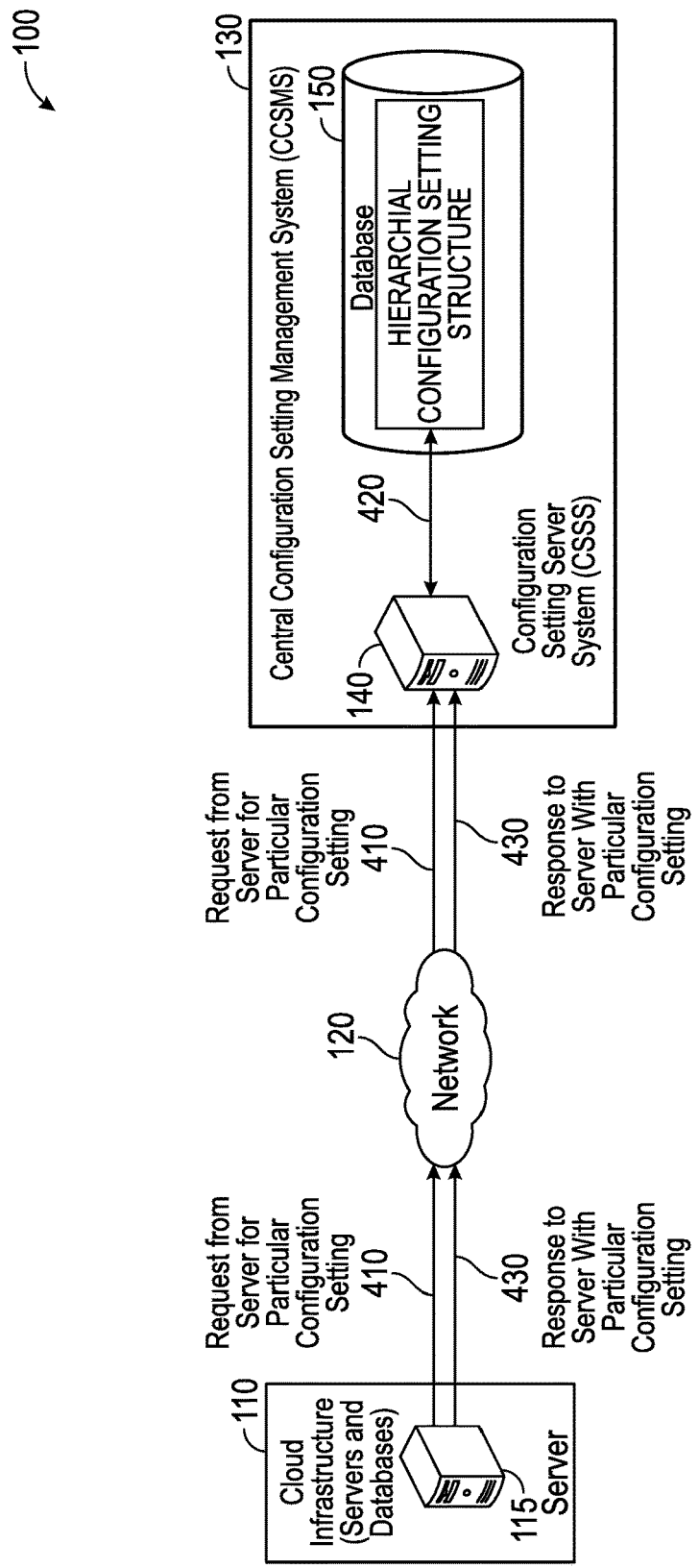
FIG. 4 is a schematic block diagram of the cloud computing environment of FIG. 1 that illustrates a process of using the HCSS to resolve a request for a particular configuration setting from one of the servers in FIG. 1 in accordance with an embodiment.

FIG. 4 is a schematic block diagram of the cloud computing environment 100 of FIG. 1 that illustrates a process of using the HCSS 160 to resolve a request for a particular configuration setting from one of the servers 115 in FIG. 1 in accordance with an embodiment. FIG. 4 will be described with reference to FIGS. 1-3. At 410, one of the servers 115 that are part of the cloud infrastructure 110 communicates a request for a particular configuration setting (associated with one of its services) over the network 120 to the CSSS 140. This request can include a service key for that service and the name of the configuration setting. At 420, the processing system(s) 220 of the CSSS 140 executes the configuration resolution instructions 212 to process the service key and the name of the configuration setting (e.g., to determine its location and arrangement within the HCSS 160) and retrieves that particular configuration setting from the HCSS 160 that is stored in the database 150. At 430, the processing system(s) 220 of the CSSS 140 executes the configuration resolution instructions 212 to create a response that includes that particular configuration setting and transmits that response over the network 120 to the server 115 that requested the configuration setting.

The logical structure of the services of the cloud infrastructure 110 can vary widely depending on the cloud computing environment 100, and the configuration settings for each service can vary depending on how the services are logically structured within the cloud infrastructure 110. The logical structure of the services of the cloud infrastructure 110 influences the structure of the HCSS 160. To address this, in accordance with the disclosed embodiments, a system administrator can define, based on the logical structure of the services that make up the cloud infrastructure 110, a service key with multiple (N) levels of identifiers that are used to identify each service within the cloud infrastructure 110.

To illustrate the concepts of a HCSS 160 and a service key, one particular, non-limiting example will now be described below with reference to FIGS. 5-9. In this particular example, it is assumed that the service key includes three identifiers (i.e., N=3), and therefore the HCSS that is ultimately created will be a four-level hierarchy (i.e., M=4). Although three levels are used to identify each service in this particular logical structure, it should be appreciated that this embodiment is not limiting and that in general the logical structure used to identify each service can include N levels, where N is an integer greater than or equal to two.

Figure 5:
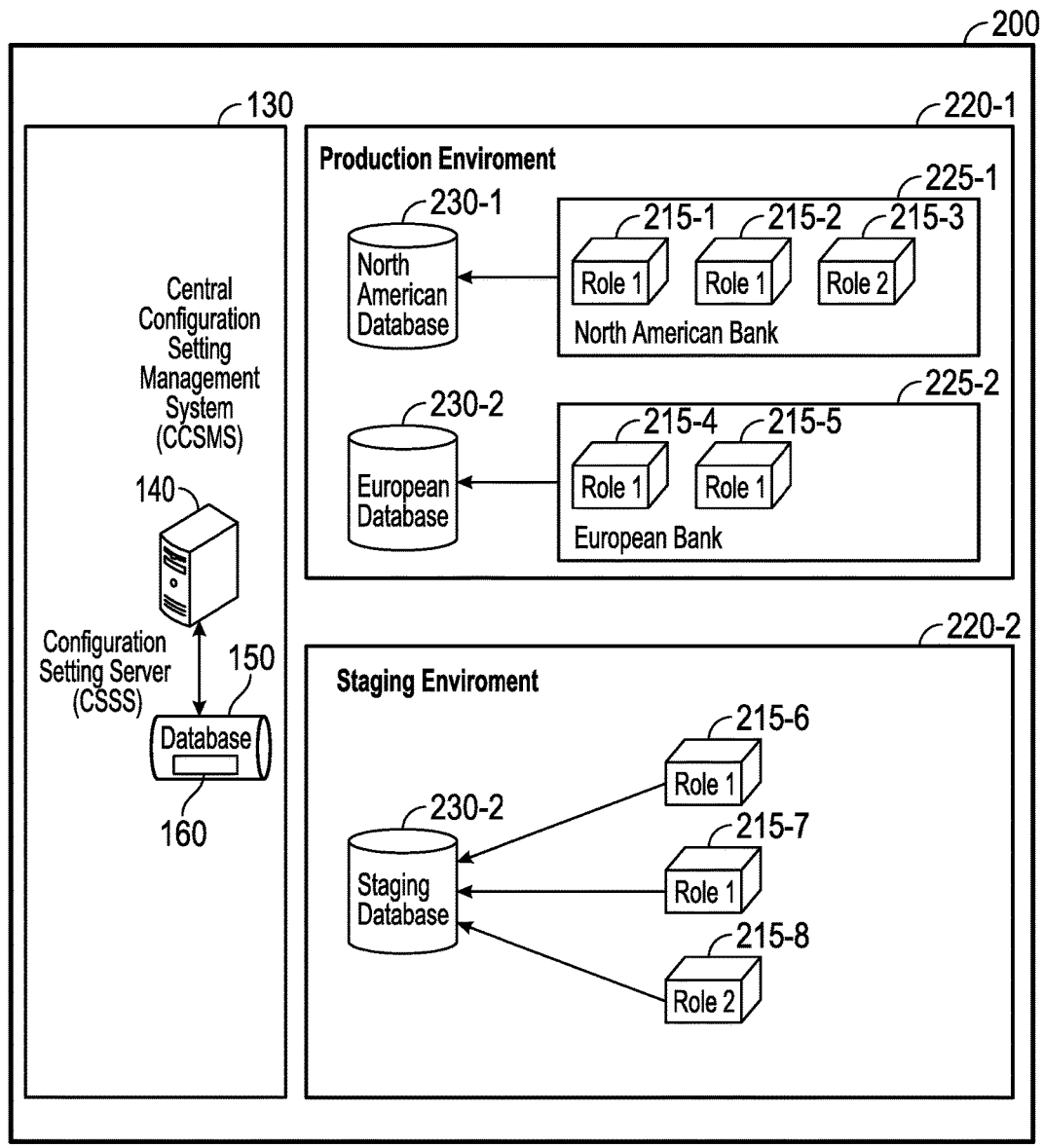
FIG. 5 is a schematic block diagram of one implementation of a cloud computing environment that illustrates the concepts of environments, roles and banks in accordance with an embodiment.

FIG. 5 is a simplified schematic block diagram of one implementation of a cloud computing environment 200 in accordance with an embodiment. FIG. 5 will be described with reference to FIGS. 1-4. In accordance with this non-limiting embodiment, each service that is part of the cloud infrastructure offered by the cloud computing environment 200 fits within a logical structure where that service can be identified by an environment, a role and optionally a bank.

Each service can be assigned a service key that identifies an environment that the service is part of or belongs to, a role that specifies a specific function of that service in the environment, and optionally a bank that specifies a subdivision of the role to differentiate that service from other services having the same role in a different bank. For purposes of distinguishing the identifiers that make up the service key, the first-level identifier will be referred to as an environment identifier that identifies the environment a particular service belongs to (or is associated with), the second-level identifier will be referred to as a role identifier and the third-level identifier, which is optional, will be referred to as a bank identifier. In other words, the service key will include identifiers that identify an environment, a role and optionally a bank that the particular service is part of.

At the highest level, an environment that a particular service is part of is a complete standalone instance of a platform. For example, in one implementation, environments might include Production, Demo, Staging, Testing, Training, Development, Disaster Recovery environments, etc. Each environment is a snapshot of the platform used for a specific purpose in the lifecycle of the product. In FIG. 5, the production environment 220-1 and the staging environment 220-1 are shown for sake of simplicity.

The production environment 220-1 includes a first bank 225-1 (also referred to a North American bank) and a second bank 225-2 (also referred to as European Bank). The services provided by each bank 225 are referred to as roles 215-1 . . . 215-5. Each role 215-1 . . . 215-3 in the first bank 225-1 is associated with a first database 230-1, and each role 215-4 . . . 215-5 in the second bank 225-2 is associated with a second database 230-2.

A role is a specific function that any given server is fulfilling, but does not necessarily correspond to a particular physical server system, but instead corresponds to a combination of a particular service hosted by a particular physical server system. To explain further, if most servers are provisioned using a fairly standard template, then the combination of what software is installed on it and how that software is configured to behave is what makes any particular server unique and defines it's role within the cloud infrastructure. It should also be appreciated that one physical server system can have multiple roles if it runs different services, and that there is not necessarily a direct correspondence between a role and a server system in all cases unless that server provides a single service.

A bank is a further sub-division of the role. A bank can be used to differentiate a service from other services having the same role in a different bank. With a large globally distributed platform there are cases where services holding the same role need to have some differing configuration settings. For example, servers located in North America might be configured to point to databases in New York, while servers located in Europe might connect to databases in Paris. These servers might all have the same role so most of their configuration settings might be consistent across all servers. But for some configuration settings there is a need to have them set at the bank level.

In some cases, each service offered by the cloud infrastructure 110 can be distributed over or among multiple different physical server systems. For instance, role 1 215-1 and role 1 215-2 offer the same service from different server systems within the first bank 225-1. However, role 2 215-3 offers a different service than role 1 215-1 or role 1 215-2, but could be implemented at the same physical server system as role 1 215-1 or role 1 215-2 or at different server systems as role 1 215-1 or role 1 215-2.

The staging environment 220-2 does not include any banks, and each role 215-6 . . . 215-8 in the staging environment 220-2 is associated with a third database 230-1. As above, role 1 215-6 and role 1 215-7 offer the same service from different server systems, whereas role 2 215-3 offers a different service, but could be implemented at the same physical server system as role 1 215-6 or role 1 215-7 or at a different server system as role 1 215-6 or role 1 215-7.

Given this explanation of one possible logical structure for the different services of the cloud computing environment 200 of FIG. 5, an example will now be described of how the HCSS 160 can be generated with reference to FIG. 6.

Figure 6:
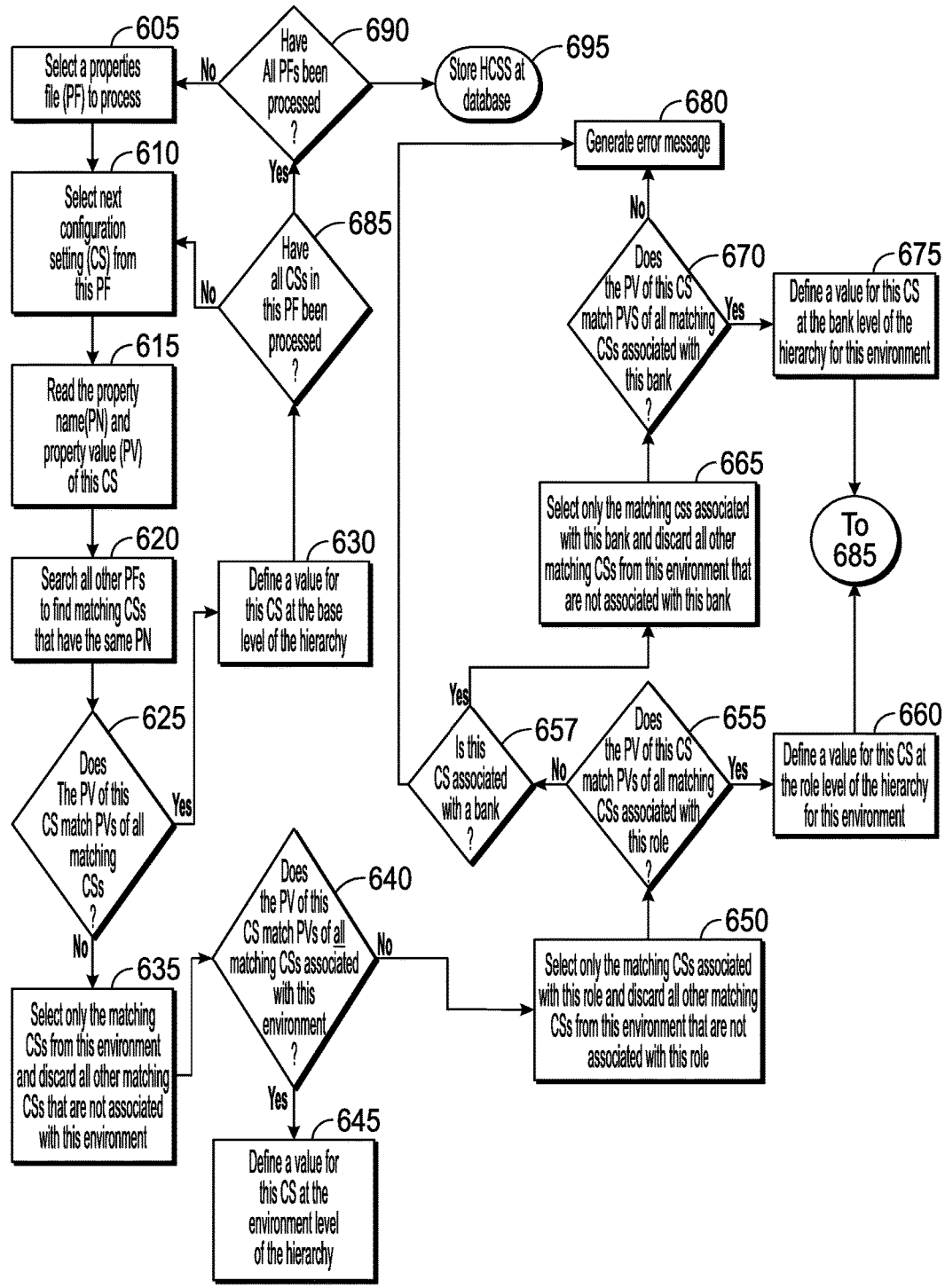
FIG. 6 is a flow diagram of an exemplary method for generating a HCSS in accordance with an embodiment.

FIG. 6 is a flow diagram of an exemplary method 600 for generating the HCSS 160 in accordance with an embodiment. FIG. 6 will be described with reference to FIGS. 1-5. As a preliminary matter, it should be understood that steps of the method 600 are not necessarily presented in any particular order and that performance of some or all the steps in an alternative order is possible and is contemplated. The steps have been presented in the demonstrated order for ease of description and illustration. Further, steps can be added, omitted, and/or performed simultaneously without departing from the scope of the appended claims. It should also be understood that the illustrated method 600 can be stopped at any time. In certain embodiments, some or all steps of this process, and/or substantially equivalent steps, are performed by execution of processor-readable instructions stored or included on a processor-readable medium, for example. For instance, in the description of FIG. 6 that follows, the CSSS 140 will be described as performing various acts, tasks or steps, but it should be appreciated that this refers to the processing system(s) 220 of the CSSS 140 executing the hierarchy creation instructions 210 to perform those various acts, tasks or steps. Depending on the implementation, the processing system(s) 220 of the CSSS 140 can be centrally located together, or distributed among a number of server systems that work together to execute the hierarchy creation instructions 210.

Prior to method 600, the CSSS 140 obtains properties files from all of the servers that are part of the cloud infrastructure 110, as well as a service key for each service. Each properties file has a corresponding service key that is associated with it. In the embodiment illustrated in FIG. 5, each service key will include at least two identifiers. The first or broadest identifier used in the service keys will be the environment identifier, which uniquely identifies each environment in the system, and the second identifier in each service key will be a role identifier. In addition, in some cases, the service key will also include a bank identifier.

Method 600 begins that 605, where the CSSS 140 selects a particular one of the properties file the process. At 610, the CSSS 140 selects configuration setting from the properties file that was selected at 605. At 615, the CSSS 140 reads the property name and the property value of this configuration setting (that was selected at 610).

At 620, the CSSS 140 searches all other properties files to find "matching configuration settings." Matching configuration setting are configuration settings that have the same property name as the configuration setting that was selected at 610. The scope of what constitutes "all other properties files" at step 620 can vary depending on the implementation. In this embodiment, "all other properties files" include all of the properties files that were obtained by the CSSS 140 (i.e., all properties files from the cloud infrastructure 110).

At 625, the CSSS 140 determines whether the property value of this configuration setting (that was selected at 610) matches the property values of all other matching configuration settings that were determined to have the same property name at 620.

When the CSSS 140 determines (at 625) that the property value of this configuration setting (that was selected at 610) matches the property values of all other matching configuration settings (that were determined to have the same property name at 620), the method 600 proceeds to 630 where the CSSS 140 defines a value for this configuration setting at the base level of the hierarchy.

By contrast, when the CSSS 140 determines (at 625) that the property value of this configuration setting (that was selected at 610) does not match the property values of all other matching configuration settings (that were determined to have the same property name at 620), the method 600 proceeds to 635, where the CSSS 140 selects only the matching configuration settings from this particular environment and discards all their matching configuration settings that are not associated with this environment. This new subset of matching configuration settings can then be evaluated at 640.

At 640, the CSSS 140 determines whether the property value of this configuration setting (that was selected at step 610) matches the property values of all matching configuration settings that are associated with this particular environment.

When the CSSS 140 determines (at 640) that the property value of this configuration setting (that was selected at step 610) matches the property values of all matching configuration settings that are associated with this particular environment, the method 600 proceeds to 645, where the CSSS 140 defines a value for this configuration setting at the environment level the hierarchy.

When the CSSS 140 determines (at 640) that the property value of this configuration setting (that was selected at step 610) does not match the property values of all matching configuration settings that are associated with this particular environment, the method 600 proceeds to 650, where the CSSS 140 selects only the matching configuration settings associated with this role, and discards all other matching configuration settings from this environment that are not associated with this role. At 655, the CSSS 140 determines whether the property value of the configuration setting (that was selected at 610) matches the property values of all matching configuration settings associated with this role within this environment.

When the CSSS 140 determines (at 655) that the property value of the configuration setting (that was selected at 610) matches the property values of all matching configuration settings associated with this role within this environment, the method proceeds to 660, where the CSSS 140 defines a value for this configuration setting (that was selected at 610) at the role level of the hierarchy for this environment. The method then proceeds to 685.

When the CSSS 140 determines (at 655) that the property value of the configuration setting (that was selected at 610) does not match the property values of all matching configuration settings associated with this role within this environment, the method 600 proceeds to 657, where the CSSS 140 determines whether the configuration setting (that was selected at 610) is associated with a bank by reading the service key associated with this configuration setting and determining if it includes a bank identifier. When the CSSS 140 determines (at 657) that the service key associated with this configuration setting (that was selected at 610) does not include a bank identifier and is therefore not associated with a bank, the method 600 proceeds to 680, where the CSSS 140 generates an error message and communicates it to an administrator of the cloud infrastructure 110. This is because in this embodiment, at the lowest level in the hierarchy all services should have identical configuration settings. At this level the services exist for redundancy and should be configured the same, so mismatched configuration settings are indicative of services not actually sharing the same role.

When the CSSS 140 determines (at 657) that the service key associated with this configuration setting (that was selected at 610) includes a bank identifier and is therefore associated with a bank, the method 600 proceeds to 665, where the CSSS 140 selects only the matching configuration settings associated with this bank (of this environment) and discards all other matching configuration settings from this environment that are not associated with this bank.

The method 600 then proceeds to 670, where the CSSS 140 determines whether the property value of this configuration setting (that was selected as 610) matches the property values of all matching configuration settings that are associated with this bank (of this environment). When the CSSS 140 determines (at 670) that the property value of this configuration setting (that was selected as 610) matches the property values of all matching configuration settings that are associated with this bank of this environment, the method 600 proceeds to 675 where the CSSS 140 defines a value for this configuration setting (that was selected at 610) at the bank level of the hierarchy within this role for this environment. The method 600 then proceeds to 685.

When the CSSS 140 determines (at 670) that the property value of this configuration setting (that was selected as 610) does not match the property values of all matching configuration settings that are associated with this bank of this environment, the method 600 proceeds to 680, where the CSSS 140 generates and communicates an error message to the administrator of the cloud infrastructure 110.

At 685, the CSSS 140 determines whether all of the configuration settings in the property file (that was selected at 605 during this iteration) have been processed. When the CSSS 140 determines (at 685) that all of the configuration settings in the properties file (that was selected at 605 during this iteration) have not been processed, the method 600 loops back to 610, where the CSSS 140 selects the next configuration setting from the properties file (that was selected at 605 previously). By contrast, when the CSSS 140 determines (at 685) that all of the configuration settings in the properties file (that was selected at 605 during this iteration) have been processed, the method 600 proceeds to 690, where the CSSS 140 determines whether all property files (that were obtained by the CSSS 140) have been processed.

When the CSSS 140 determines that all property files (that were obtained by the CSSS 140) have not yet been processed, the method 600 loops back to 605, where the CSSS 140 selects the next properties file to process.

The method 600 repeats until a determination is made at 690 that all properties files have been processed, at which point, the method 600 proceeds to 695, where the CSSS 140 stops processing and stores the final version of the HCSS 160 at the database 150 of FIG. 1. The HCSS 160 is then ready to be queried by any of the services within the cloud infrastructure 110.

Certain aspects of the method 600 are non-limiting, and could be modified in other alternative embodiments. For example, at 625, 640, 655, 670 of FIG. 6, the CSSS 140 determines whether the property value of this configuration setting (that was selected at step 610) matches the property values of "all" matching configuration settings. In an alternative embodiment, the CSSS 140 determines whether the property value of this configuration setting (that was selected at step 610) matches the property values of a majority of the matching configuration settings.

As will be appreciated, the HCSS 160 includes a base level of the hierarchy, and first through Nth levels of the hierarchy. In the example described with reference to FIG. 5-7, N is equal to three since this is the maximum number of identifiers in a service key, and therefore the HCSS 160 includes a base level (or $0^{th}$ level) and first through third levels of the hierarchy.

The base level will include the configuration settings that have the same property name and value across all environments. Each environment level (or first level) will each include the configuration settings that have the same property name and value across all roles within that particular environment. Within a particular environment, each role level (or second level) will each include the configuration settings that have the same property name and value across all banks within that particular role of that particular environment. Within a particular environment, each bank level (or third level) will each include the configuration settings that have the same property name and value across all sub-banks (if they exist) within that bank within that particular role of that particular environment.

Figure 7:
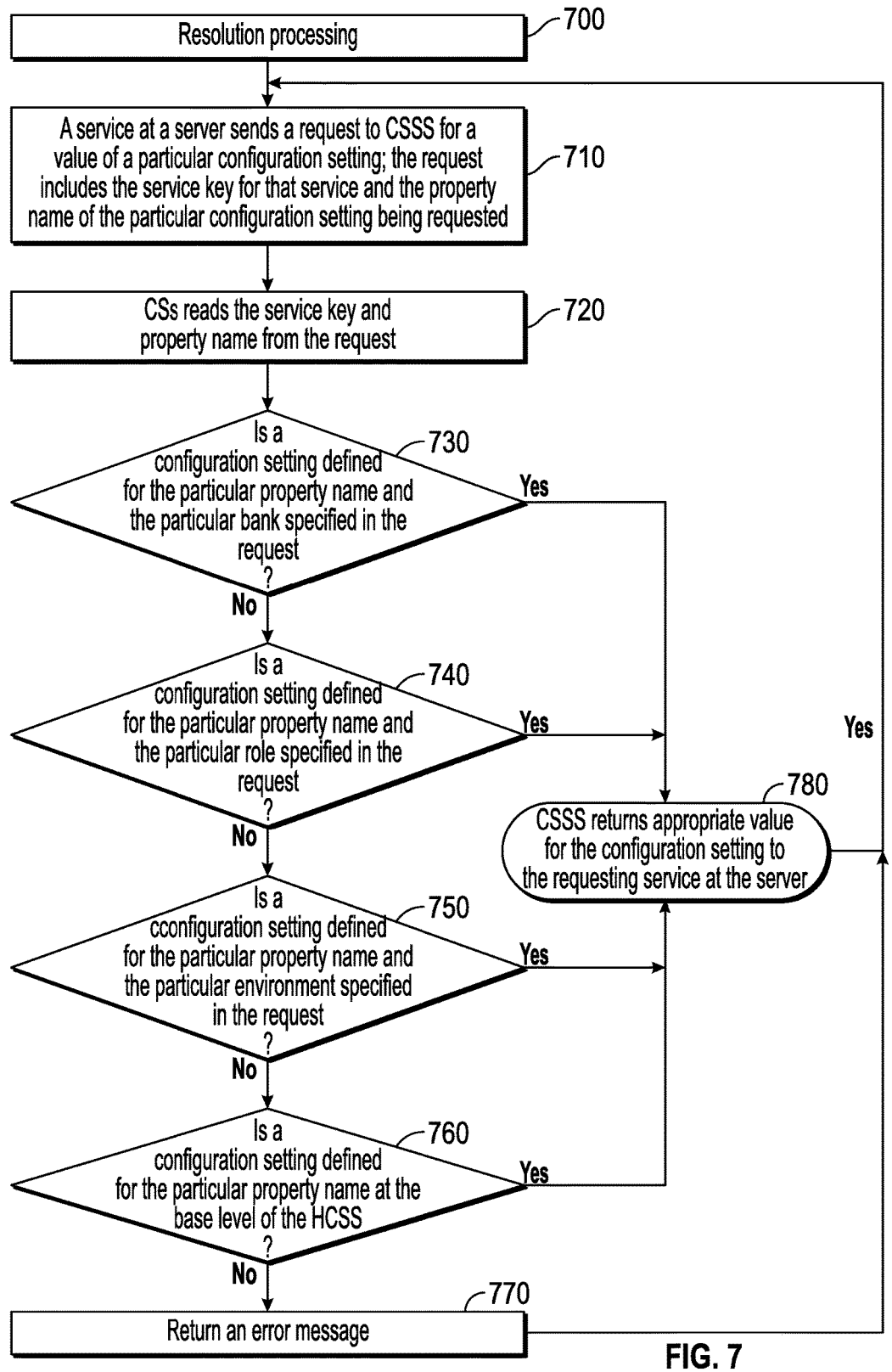
FIG. 7 is a flow diagram of an exemplary method of resolution in accordance with an embodiment.

FIG. 7 is a flow diagram of an exemplary method 700 of resolution processing that takes place to resolve a request for a particular configuration setting from one of the servers 115 in FIG. 1 in accordance with an embodiment. FIG. 7 will be described with reference to FIGS. 1-6. As with FIG. 6, it should be understood that steps of the method 700 are not necessarily presented in any particular order and that performance of some or all the steps in an alternative order is possible and is contemplated. The steps have been presented in the demonstrated order for ease of description and illustration. Further, steps can be added, omitted, and/or performed simultaneously without departing from the scope of the appended claims. It should also be understood that the illustrated method 700 can be stopped at any time. In certain embodiments, some or all steps of this process, and/or substantially equivalent steps, are performed by execution of processor-readable instructions stored or included on a processor-readable medium, for example. For instance, in the description of FIG. 7 that follows, the CSSS 140 will be described as performing various acts, tasks or steps, but it should be appreciated that this refers to the processing system(s) 220 of the CSSS 140 executing the configuration setting resolution instructions 212 (of FIG. 2) to perform those various acts, tasks or steps. Depending on the implementation, the processing system(s) 220 of the CSSS 140 can be centrally located together, or distributed among a number of server systems that work together to execute the configuration setting resolution instructions 212.

The method 700 begins at 710 when a service at one of the servers 115 sends a request to the CSSS 140 for a value of a particular configuration setting. This request includes the property name of that particular configuration setting and the service key for that particular service. In this particular example it is assumed that the service key includes three identifiers described with respect to FIG. 5. These are an environment identifier, a rule identifier, and the bank identifier.

The method 700 and proceeds to 720, where the CSSS 140 reads the service key in the property name from the request was sent from the service. At 730, the CSSS 140 determines whether the HCSS 160 includes a configuration setting defined for the property name and the particular bank that are specified in the request. When the CSSS 140 determines that the HCSS 160 does not include a configuration setting defined for the property name and the particular bank that are specified in the request, the method 700 proceeds to 740. As noted above, the bank identifier is optional and will not necessarily be included in every service key. In the event the service key does not specify a bank identifier then the method will simply proceed to 740 because there is no bank identifier. When the CSSS 140 determines that the HCSS 160 includes a configuration setting defined for property name and the particular bank that are specified in the request, the method 700 proceeds to 780, where the CSSS 140 generates and sends a response addressed to the requesting service at the server 115. This response includes the appropriate value for the requested configuration setting, and can possibly include other information including one or more identifiers that identifies the service and the property name of the configuration setting.

At 740, the CSSS 140 determines whether the HCSS 160 includes a configuration setting defined for property name and the particular role that are specified in the request. When the CSSS 140 determines that the HCSS 160 does not include a configuration setting defined for the property name and the particular role that are specified in the request, the method 700 proceeds to 750. When the CSSS 140 determines that the HCSS 160 includes a configuration setting defined for property name and the particular role that are specified in the request, the method 700 proceeds to 780, where the CSSS 140 generates and sends a response (described above) addressed to the requesting service at the server 115.

At 750, the CSSS 140 determines whether the HCSS 160 includes a configuration setting defined for property name and the particular environment that are specified in the request. When the CSSS 140 determines that the HCSS 160 does not include a configuration setting defined for the property name and the particular environment that are specified in the request, the method 700 proceeds to 760. When the CSSS 140 determines that the HCSS 160 includes a configuration setting defined for property name and the particular environment that are specified in the request, the method 700 proceeds to 780, where the CSSS 140 generates and sends a response (described above) addressed to the requesting service at the server 115.

At 760, the CSSS 140 determines whether the HCSS 160 includes a configuration setting defined for property name at the base level of the HCSS 160. When the CSSS 140 determines that the HCSS 160 does not include a configuration setting defined for the property name at the base level of the HCSS 160, the method 700 proceeds to 770 where the CSSS 140 returns an error message addressed to the requesting service at the server 115, and the method 700 loops back to 710 where the next request received is processed by the CSSS 140. When the CSSS 140 determines that the HCSS 160 includes a configuration setting defined for property name at the base level of the HCSS 160, the method 700 proceeds to 780, where the CSSS 140 generates and sends a response (described above) addressed to the requesting service at the server 115. Following step 780 the method 700 loops back to 710 where the next request received is processed by the CSSS 140.

In the example illustrated in FIG. 7, 730, 740, 750 illustrate steps performed in one embodiment when the service key has three possible identifiers and the HCSS 160 is a 4-level hierarchy that includes a 0th or base level, a first level (i.e., environment level), a second level (i.e., role level), and an optional third level (i.e., bank level). However, in other embodiments, the service key can have more than three identifiers, in which case, the hierarchy of the HCSS 160 will include additional levels. In such embodiment, additional steps could be performed prior to 730 or after 750 to examine additional levels of the hierarchy of the HCSS 160 that could be included e.g., is a configuration setting defined for the particular property name and the particular sub-bank specified in the request, etc.

Figure 8:
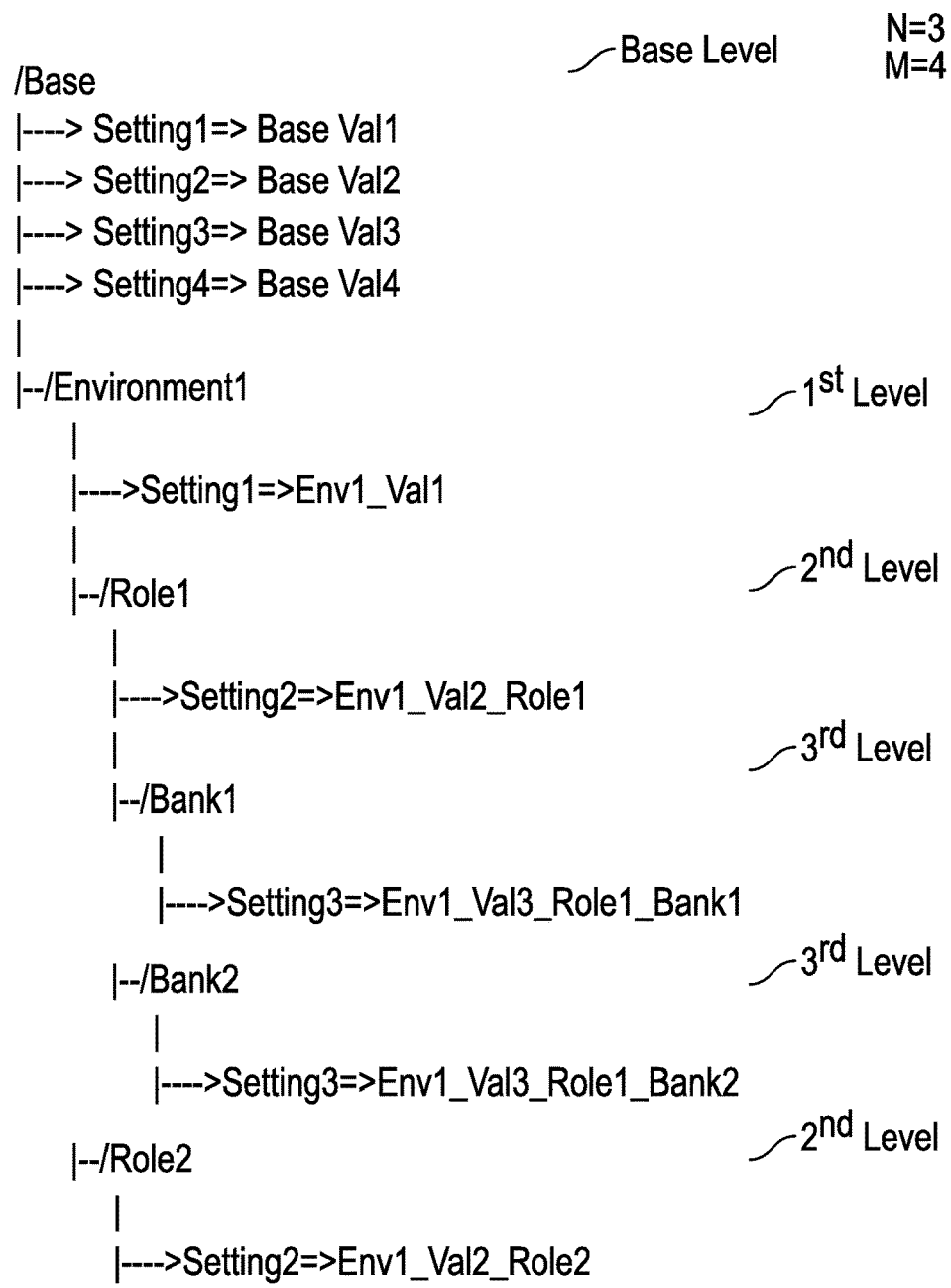
FIG. 8 is a diagram that illustrates a simplified example of a portion of an example of the HCSS and sample resolutions that would result when a request for a particular configuration setting is received in accordance with an embodiment.

FIG. 8 is a diagram that illustrates a simplified example of a portion of a HCSS 160 and sample resolutions that would result when different services hosted by the servers in FIG. 5 request particular configuration settings from the CSSS 140 in accordance with an embodiment. FIG. 8 will be described with reference to FIGS. 5-7. It should be appreciated that due to limitations of a page of paper, FIG. 8 illustrates a highly simplified example of a portion of the HCSS 160 that includes a single environment (/Environment1) with two roles (/Role1, /Role2), two banks (/Bank1, /Bank2) and four configuration settings (Setting1, Setting2, Setting3, Setting4). In a practical implementation, the HCSS 160 would include, for example, multiple environments, hundreds of roles and thousands of servers and the number of configuration settings would exceed a hundred thousand or more. This example illustrates how four configuration settings (Setting1, Setting2, Setting3, Setting4) might be distributed in a portion of the HCSS 160 in one non-limiting implementation.

The HCSS 160 has a tree-like structure with a base (or $0^{th}$) level and various nodes for the first through third levels that are organized in a hierarchical structure in which the nodes of the lower levels descend from a node of higher level. In this non-limiting example, the first level corresponds to the environment level, the second level corresponds to the role level, and the third level corresponds to the bank level.

In this particular example, the base level (or $0^{th}$ level) (/Base) includes values (BaseVal1, BaseVal2, BaseVal3, BaseVal4) for each of the four configuration settings (Setting1, Setting2, Setting3, Setting4). These represent values that are applicable to all services in all environments unless a more specific value is defined at a lower level of the configuration hierarchy of the HCSS 160.

In this particular example, the environment level (or $1^{st}$ level) (Environment1) includes a value (Env1_Val1) for the first configuration setting (Setting1). As such, when any service sends a request for the first configuration setting (Setting1) and has a service key includes an environment identifier set to environment 1 (Env1), the CSSS 140 will transmit a response that includes the value (Env1_Val1) unless a more specific value is defined at a lower level of the configuration hierarchy for environment 1. However, if another service sends a request for the first configuration setting (Setting1) and has a service key includes an environment identifier set to environment 2 (Env2) (not shown) (and the branch for environment 2 (Env2) does not specify a more specific value for the first configuration setting (Setting1)), then the CSSS 140 will transmit a response that includes the value (BaseVal1).

In this particular example, within the environment level (/Environment1), the role level (or $2^{nd}$ level) includes two sub-levels for role 1 (/Role1) and role 2 (/Role2). The sub-level for role 1 (/Role1) includes a value (Env1_Val2_Role1) for the second configuration setting (Setting2), and the sub-level for role 2 (/Role2) includes a different value (Env1_Val2_Role2) for the second configuration setting (Setting2). As such, when any service sends a request for Setting2 and has a service key includes an environment identifier set to environment 1 (Env1) and a role identifier set to role 1 (Role1), the CSSS 140 will transmit a response that includes the value (Env1_Val2_Role1) unless a more specific value is defined at a lower level of the configuration hierarchy for environment 1 and role 1 (Role1), which is not the case in this particular example, but would be true if /Bank2 included a configuration setting (Setting2=>Env1_Val2_Role1_Bank2, for example. Similarly, when any service sends a request for Setting2 and has a service key includes an environment identifier set to environment 1 (Env1) and a role identifier set to role 2 (Role2), the CSSS 140 will transmit a response that includes the value (Env1_Val2_Role2) unless a more specific value is defined at a lower level of the configuration hierarchy for environment 1 and role 2 (Role2), which is not the case in this particular example. The value (Env1_Val2_Role1) is different than the value (Env1_Val2_Role2), which means that this particular configuration setting has different values for roles 1 and 2 of environment 1.

In this particular example, within the sub-level for role 1 (/Role1), the bank level (or $3^{rd}$ level) includes two sub-sub-levels for bank 1 (/Bank1) and bank 2 (/Bank2). The sub-sub-level for bank 1 (Bank1) includes a value (Env1_Val3_Role1_Bank1) for the third configuration setting (Setting3), and the sub-sub-level for bank 2 (/Bank2) includes a different value (Env1_Val3_Role1_Bank2) for the third configuration setting (Setting3). As such, when any service sends a request for Setting3 and has a service key includes an environment identifier set to environment 1 (Env1), a role identifier set to role 1 (Role1) and a bank identifier set to bank1 (Bank1), the CSSS 140 will transmit a response that includes the value (Env1_Val3_Role1_Bank1) unless there was a sub-sub-sub-level defined at a lower level of the configuration hierarchy that included a more specific value, which is not the case in this particular example. Similarly, when any service sends a request for Setting3 and has a service key includes an environment identifier set to environment 1 (Env1), a role identifier set to role 1 (Role1) and a bank identifier set to bank2 (Bank2), the CSSS 140 will transmit a response that includes the value (Env1_Val3_Role1_Bank2) unless there was a sub-sub-sub-level defined at a lower level of the configuration hierarchy that included a more specific value, which is not the case in this particular example. Here, again, the value (Env1_Val3_Role1_Bank1) is different than the value (Env1_Val3_Role1_Bank2), which means that this particular configuration setting has different values for role 1 within banks 1 and 2 of environment 1.

To further illustrate a few examples of how the CSSS 140 would resolve certain requests within the context of this simplified HCSS 160, FIG. 8 shows three sample resolutions.

In the first example, when any service sends a request for Setting2 and has a service key includes an environment identifier set to environment 1 (Env1) and a role identifier set to role 2 (Role2), the CSSS 140 will transmit a response that includes the value (Env1_Val2_Role2).

By contrast, when any service sends a request for Setting1 and has a service key includes an environment identifier set to environment 1 (Env1), a role identifier set to role 1 (Role1) and a bank identifier set to bank2 (Bank2), the CSSS 140 will transmit a response that includes the value (Env1_Val1), which is the value for Setting1 at the environment level (/Environment1).

As another example, when any service sends a request for Setting4 and has a service key includes an environment identifier set to environment 1 (Env1), a role identifier set to role 2 (Role2) and a bank identifier set to bank2 (Bank2) (and also assuming that), the CSSS 140 will transmit a response that includes the value (BaseVal4). In other words, the CSSS 140 will transmit a response that includes the value (BaseVal4) because there is no bank level defined within the role 2 level.

Figure 9:
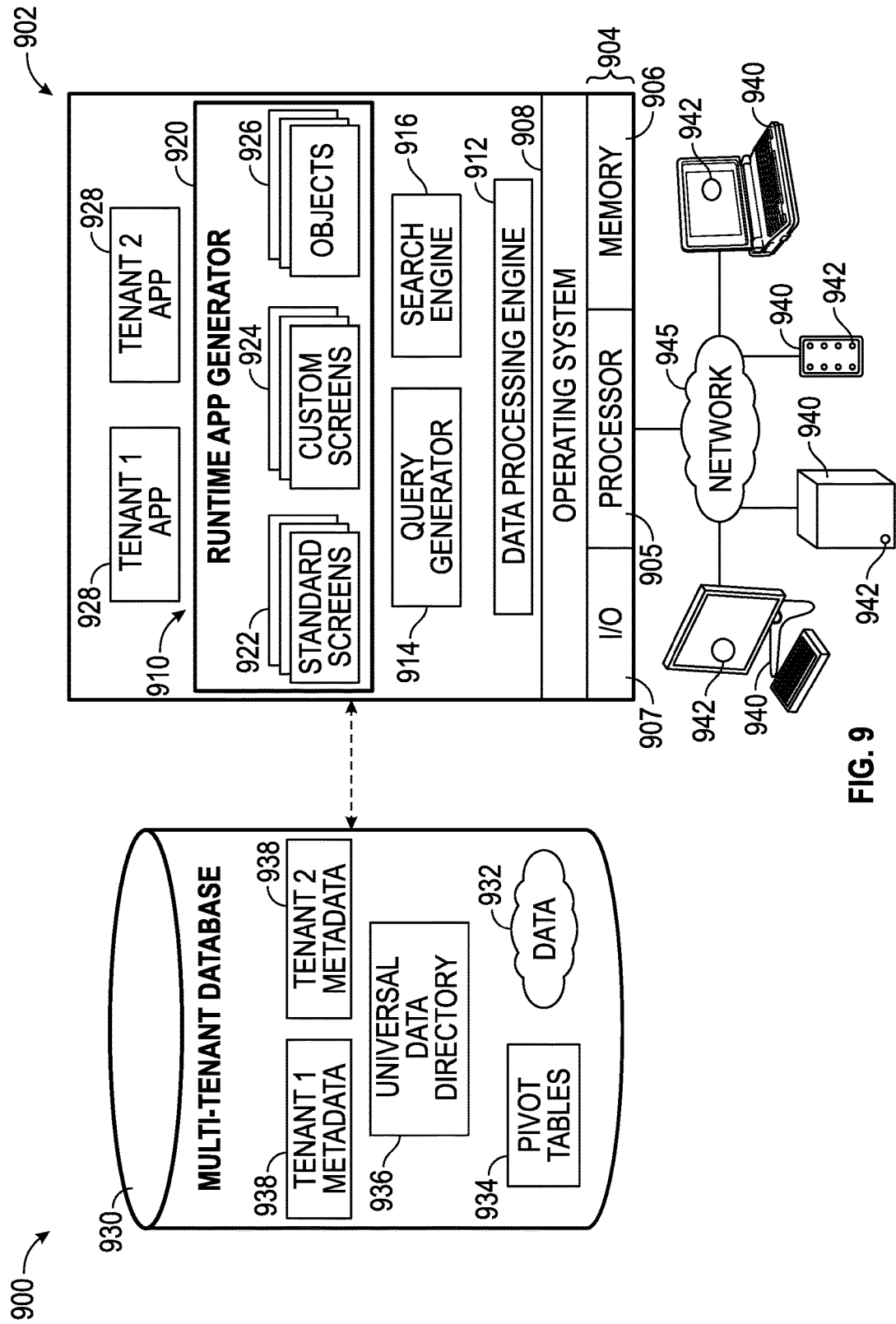
FIG. 9 is a schematic block diagram of a multi-tenant computing environment in accordance with an embodiment.

FIG. 9 is a schematic block diagram of a multi-tenant computing environment in accordance with an embodiment.

Turning now to FIG. 9, an exemplary cloud based solution may be implemented in the context of a multi-tenant system 900 including a server 902 that supports applications 928 based upon data 932 from a database 930 that may be shared between multiple tenants, organizations, or enterprises, referred to herein as a multi-tenant database. Data and services generated by the various applications 928 are provided via a network 945 to any number of client devices 940, such as desk tops, laptops, tablets, smartphones, Google Glass™, and any other computing device implemented in an automobile, aircraft, television, or other business or consumer electronic device or system, including web clients. Each client device, application, or web client is suitably configured to run a client application 942.

Each application 928 is suitably generated at run-time (or on-demand) using a common application platform 910 that securely provides access to the data 932 in the database 930 for each of the various tenant organizations subscribing to the service cloud 900. In accordance with one non-limiting example, the service cloud 900 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that shares access to common subset of the data within the multi-tenant database 930. In this regard, each tenant includes one or more users and/or groups associated with, authorized by, or otherwise belonging to that respective tenant. Stated another way, each respective user within the multi-tenant system 900 is associated with, assigned to, or otherwise belongs to a particular one of the plurality of enterprises supported by the system 900.

Each enterprise tenant may represent a company, corporate department, business or legal organization, and/or any other entities that maintain data for particular sets of users (such as their respective employees or customers) within the multi-tenant system 900. Although multiple tenants may share access to the server 902 and the database 930, the particular data and services provided from the server 902 to each tenant can be securely isolated from those provided to other tenants. The multi-tenant architecture therefore allows different sets of users to share functionality and hardware resources without necessarily sharing any of the data 932 belonging to or otherwise associated with other organizations.

The multi-tenant database 930 may be a repository or other data storage system capable of storing and managing the data 932 associated with any number of tenant organizations. The database 930 may be implemented using conventional database server hardware. In various embodiments, the database 930 shares processing hardware 904 with the server 902. In other embodiments, the database 930 is implemented using separate physical and/or virtual database server hardware that communicates with the server 902 to perform the various functions described herein.

In an exemplary embodiment, the database 930 includes a database management system or other equivalent software capable of determining an optimal query plan for retrieving and providing a particular subset of the data 932 to an instance of application (or virtual application) 928 in response to a query initiated or otherwise provided by an application 928, as described in greater detail below. The multi-tenant database 930 may alternatively be referred to herein as an on-demand database, in that the database 930 provides (or is available to provide) data at run-time to on-demand virtual applications 928 generated by the application platform 910, as described in greater detail below.

In practice, the data 932 may be organized and formatted in any manner to support the application platform 910. In various embodiments, the data 932 is suitably organized into a relatively small number of large data tables to maintain a semi-amorphous "heap"-type format. The data 932 can then be organized as needed for a particular virtual application 928. In various embodiments, conventional data relationships are established using any number of pivot tables 934 that establish indexing, uniqueness, relationships between entities, and/or other aspects of conventional database organization as desired. Further data manipulation and report formatting is generally performed at run-time using a variety of metadata constructs. Metadata within a universal data directory (UDD) 936, for example, can be used to describe any number of forms, reports, workflows, user access privileges, business logic and other constructs that are common to multiple tenants.

Tenant-specific formatting, functions and other constructs may be maintained as tenant-specific metadata 938 for each tenant, as desired. Rather than forcing the data 932 into an inflexible global structure that is common to all tenants and applications, the database 930 is organized to be relatively amorphous, with the pivot tables 934 and the metadata 938 providing additional structure on an as-needed basis. To that end, the application platform 910 suitably uses the pivot tables 934 and/or the metadata 938 to generate "virtual" components of the virtual applications 928 to logically obtain, process, and present the relatively amorphous data 932 from the database 930.

The server 902 may be implemented using one or more actual and/or virtual computing systems that collectively provide the dynamic application platform 910 for generating the virtual applications 928. For example, the server 902 may be implemented using a cluster of actual and/or virtual servers operating in conjunction with each other, typically in association with conventional network communications, cluster management, load balancing and other features as appropriate. The server 902 operates with any sort of conventional processing hardware 904, such as a processor 905, memory 906, input/output features 907 and the like. The input/output features 907 generally represent the interface(s) to networks (e.g., to the network 945, or any other local area, wide area or other network), mass storage, display devices, data entry devices and/or the like.

The processor 905 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 906 represents any non-transitory short or long term storage or other computer-readable media capable of storing programming instructions for execution on the processor 905, including any sort of random access memory (RAM), read only memory (ROM), flash memory, magnetic or optical mass storage, and/or the like. The computer-executable programming instructions, when read and executed by the server 902 and/or processor 905, cause the server 902 and/or processor 905 to create, generate, or otherwise facilitate the application platform 910 and/or virtual applications 928 and perform one or more additional tasks, operations, functions, and/or processes described herein. It should be noted that the memory 906 represents one suitable implementation of such computer-readable media, and alternatively or additionally, the server 902 could receive and cooperate with external computer-readable media that is realized as a portable or mobile component or platform, e.g., a portable hard drive, a USB flash drive, an optical disc, or the like.

The application platform 910 is any sort of software application or other data processing engine that generates the virtual applications 928 that provide data and/or services to the client devices 940. In a typical embodiment, the application platform 910 gains access to processing resources, communications interfaces and other features of the processing hardware 904 using any sort of conventional or proprietary operating system 908. The virtual applications 928 are typically generated at run-time in response to input received from the client devices 940. For the illustrated embodiment, the application platform 910 includes a bulk data processing engine 912, a query generator 914, a search engine 916 that provides text indexing and other search functionality, and a runtime application generator 920. Each of these features may be implemented as a separate process or other module, and many equivalent embodiments could include different and/or additional features, components or other modules as desired.

The runtime application generator 920 dynamically builds and executes the virtual applications 928 in response to specific requests received from the client devices 940. The virtual applications 928 are typically constructed in accordance with the tenant-specific metadata 938, which describes the particular tables, reports, interfaces and/or other features of the particular application 928. In various embodiments, each virtual application 928 generates dynamic web content that can be served to a browser or other client program 942 associated with its client device 940, as appropriate.

The runtime application generator 920 suitably interacts with the query generator 914 to efficiently obtain multi-tenant data 932 from the database 930 as needed in response to input queries initiated or otherwise provided by users of the client devices 940. In a typical embodiment, the query generator 914 considers the identity of the user requesting a particular function (along with the user's associated tenant), and then builds and executes queries to the database 930 using system-wide metadata 936, tenant specific metadata 938, pivot tables 934, and/or any other available resources. The query generator 914 in this example therefore maintains security of the common database 930 by ensuring that queries are consistent with access privileges granted to the user and/or tenant that initiated the request.

With continued reference to FIG. 9, the data processing engine 912 performs bulk processing operations on the data 932 such as uploads or downloads, updates, online transaction processing, and/or the like. In many embodiments, less urgent bulk processing of the data 932 can be scheduled to occur as processing resources become available, thereby giving priority to more urgent data processing by the query generator 914, the search engine 916, the virtual applications 928, etc.

In exemplary embodiments, the application platform 910 is utilized to create and/or generate data-driven virtual applications 928 for the tenants that they support. Such virtual applications 928 may make use of interface features such as custom (or tenant-specific) screens 924, standard (or universal) screens 922 or the like. Any number of custom and/or standard objects 926 may also be available for integration into tenant-developed virtual applications 928. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 932 associated with each virtual application 928 is provided to the database 930, as appropriate, and stored until it is requested or is otherwise needed, along with the metadata 938 that describes the particular features (e.g., reports, tables, functions, objects, fields, formulas, code, etc.) of that particular virtual application 928. For example, a virtual application 928 may include a number of objects 926 accessible to a tenant, wherein for each object 926 accessible to the tenant, information pertaining to its object type along with values for various fields associated with that respective object type are maintained as metadata 938 in the database 930. In this regard, the object type defines the structure (e.g., the formatting, functions and other constructs) of each respective object 926 and the various fields associated therewith.

Still referring to FIG. 9, the data and services provided by the server 902 can be retrieved using any sort of personal computer, mobile telephone, tablet or other network-enabled client device 940 on the network 945. In an exemplary embodiment, the client device 940 includes a display device, such as a monitor, screen, or another conventional electronic display capable of graphically presenting data and/or information retrieved from the multi-tenant database 930, as described in greater detail below.

Typically, the user operates a conventional browser application or other client program 942 executed by the client device 940 to contact the server 902 via the network 945 using a networking protocol, such as the hypertext transport protocol (HTTP) or the like. The user typically authenticates his or her identity to the server 902 to obtain a session identifier ("SessionID") that identifies the user in subsequent communications with the server 902. When the identified user requests access to a virtual application 928, the runtime application generator 920 suitably creates the application at run time based upon the metadata 938, as appropriate. However, if a user chooses to manually upload an updated file (through either the web based user interface or through an API), it will also be shared automatically with all of the users/devices that are designated for sharing.

As noted above, the virtual application 928 may contain Java, ActiveX, or other content that can be presented using conventional client software running on the client device 940; other embodiments may simply provide dynamic web or other content that can be presented and viewed by the user, as desired. As described in greater detail below, the query generator 914 suitably obtains the requested subsets of data 932 from the database 930 as needed to populate the tables, reports or other features of the particular virtual application 928.

In various embodiments, virtual application 928 may include tools which allow individual tenants to customize applications using the Apex™ platform available at from Salesforce.com. Customizing applications may include, for example, writing custom objects, custom fields, business logic and processes, and defining custom triggers. An exemplary custom object such as "contacts" may be used by various departments within an organization (e.g., accounting, finance, marketing, and the like). In presently known systems, when a developer desires to configure or modify business logic or triggering behavior associated with a custom object for a particular user group, a code change is typically required. This can be cumbersome, and may impact governor limits (e.g., runtime query quotas) for other users and/or groups using the same shared object.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming, computer networking, database querying, database statistics, query plan generation, XML and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions.

For example, an embodiment of a system or a component may employ various integrated circuit components, e.g., memory elements, digital signal processing elements, logic elements, look-up tables, or the like, which may carry out a variety of functions under the control of one or more microprocessors or other control devices. In this regard, the subject matter described herein can be implemented in the context of any computer-implemented system and/or in connection with two or more separate and distinct computer-implemented systems that cooperate and communicate with one another. That said, in exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

The invention claimed is:

1. A cloud-based computing system, comprising:
   cloud infrastructure that hosts a plurality of services, wherein each service is associated with configuration settings for that service;
   a network; and
   a central configuration setting management system (CCSMS), communicatively coupled to the cloud infrastructure via the network, wherein the CCSMS further comprises:
   a database that is configured to store a hierarchical configuration setting structure (HCSS) that is configured to store all configuration settings for each of the services of the cloud infrastructure in a hierarchal configuration that comprises a hierarchy of M levels, wherein M is an integer greater than or equal to three; and a configuration setting server system (CSSS) configured to:
receive a request from a particular one of the services for a value of a particular configuration setting;
query the HCSS for the value to retrieve the value of the particular configuration setting that was requested by that particular service; and
generate a response to that particular service comprising: the value for the particular configuration setting that was requested by that particular service; and
communicate the response over the network to the particular service that requested the value of the particular configuration setting.

2. The cloud-based computing system of claim 1, wherein the request comprises:
a property name of the particular configuration setting; and
a service key that logically identifies the particular service that generated that request within the cloud infrastructure.

3. The cloud-based computing system of claim 2, wherein the service key comprises:
N-levels of identifiers that identify the particular service that generated that request, wherein N is an integer greater than or equal to two.

4. The cloud-based computing system of claim 3, wherein the service key comprises at least:
a first-level identifier; and
a second-level identifier that is different and more specific than the first-level identifier.

5. The cloud-based computing system of claim 4, wherein the first-level identifier is:
an environment identifier that identifies a particular environment that this particular service is associated with, wherein the particular environment is a complete stand-alone instance of a platform that is used for a specific purpose during a lifecycle of a product, and
wherein the second-level identifier is:
a role identifier that identifies a specific function that a particular physical server system and the particular service associated with that particular physical server system provides within the environment to distinguish from another specific function provided by another particular physical server system and a service associated with that other particular physical server system.

6. The cloud-based computing system of claim 5, wherein the base level of the HCSS is configured to store values of configuration settings that are applicable to all services in all environments unless a more specific value is defined at a lower level of the HCSS,
wherein the first level of the HCSS is:
an environment level that is configured to store values of configuration settings that are applicable to a particular environment unless a more specific value is defined at a lower level of the configuration hierarchy for the particular environment, and
wherein the second level of the HCSS is:
a role level that is a sub-level of the environment level that is configured to store values of configuration settings that are applicable to a particular role unless a more specific value is defined at a lower level of the configuration hierarchy for the particular role.

7. The cloud-based computing system of claim 6, wherein the service key further comprises:
a third-level identifier that identifies the particular service that generated that request, wherein the third-level identifier is different and more specific than the second-level identifier and the first-level identifier.

8. The cloud-based computing system of claim 7, wherein the third-level identifier is a bank identifier that specifies a sub-division of a role to differentiate a service in one bank from other services having the same role in a different bank, and
wherein the third level of the HCSS is:
a bank level that is a sub-level of the of a role level that is configured to store values of configuration settings that are applicable to a particular bank unless a more specific value is defined at a lower level of the configuration hierarchy for the particular bank.

9. The cloud-based computing system of claim 2, wherein the M levels of the HCSS comprise:
a base level, a first level, and a second level that are organized in a hierarchical structure.

10. The cloud-based computing system of claim 4, wherein the environment identifier identifies one of:
a production environment;
a staging environment;
a demo environment;
a testing environment;
a training environment;
a development environment; and
a disaster recovery environment.

11. The cloud-based computing system of claim 1, wherein the cloud infrastructure comprises:
a plurality of servers each being configured to host at least one service of the plurality of services that are hosted by the cloud infrastructure,
wherein each of the plurality of servers is configured to initially provide at least one properties file from a service hosted at that server to the CSSS,
wherein the CSSS is configured to:
extract configuration settings from each of the properties file received from each of the services within the cloud infrastructure;
determine an appropriate level within a hierarchy of the configuration settings that each configuration setting is to be assigned to; and
write each of the configuration settings to the appropriate level within the hierarchy of the configuration settings to generate the HCSS that is stored in the database of the CCSMS.

12. The cloud-based computing system of claim 11, wherein the CSSS is further configured to:
apply an update to one of the configuration settings that applies to more than one of the services of the cloud computing environment, based on the property name of the configuration setting and the service key that is associated with that configuration setting.

13. A method in a cloud-based computing system that comprises a cloud infrastructure that hosts a plurality of services, comprising:
storing, at a database associated with a central configuration setting management system (CCSMS), a hierarchical configuration setting structure (HCSS) that is configured to store each of the configuration settings for each of the plurality of services hosted by the cloud infrastructure in a hierarchal configuration that comprises a hierarchy of M levels, wherein M is an integer greater than or equal to three, wherein each service is associated with configuration settings for that service;

receiving, via a network communicatively coupled to the cloud infrastructure, a request from a particular service for a particular configuration setting;

retrieving, from the CCSMS via a configuration setting server system (CSSS) in response to the request from the particular service, a value of the particular configuration setting that was requested by that particular service;

generating a response comprising: the value for the particular configuration setting; and communicating, over the network, the response to the particular service that requested the value of the particular configuration setting.

14. The method of claim 13, wherein the request comprises:
   a property name of the particular configuration setting; and
   a service key that logically identifies, within the cloud infrastructure, the particular service that generated that request,
   wherein the service key comprises: N-levels of identifiers that identify the particular service that generated that request, wherein N is an integer greater than or equal to two.

15. The method of claim 14, wherein the M levels of the HCSS comprise:
   a base level, a first level, and a second level that are organized in a hierarchical structure.

16. A non-transitory computer-readable medium including instructions, which when executed by a processor at a server, are configurable to perform a method comprising:
   storing, at a database associated with a central configuration setting management system (CCSMS), a hierarchical configuration setting structure (HCSS), where the HCSS is configured to store each of the configuration settings for each of a plurality of services hosted by cloud infrastructure of a cloud-based computing system in a hierarchal configuration that comprises a hierarchy of M levels, wherein M is an integer greater than or equal to three, wherein each service is associated with configuration settings for that service;
   receiving, via a network communicatively coupled to the cloud infrastructure, a request from a particular service for a particular configuration setting;
   retrieving, from the CCSMS via a configuration setting server system (CSSS) in response to the request from the particular service, a value of the particular configuration setting that was requested by that particular service;
   generating a response comprising: the value for the particular configuration setting; and
   communicating, over the network, the response to the particular service that requested the value of the particular configuration setting.

17. The non-transitory computer-readable medium of claim 16,
   wherein the request comprises: a property name of the particular configuration setting; and a service key that logically identifies, within the cloud infrastructure, the particular service that generated that request,
   wherein the service key comprises: N-levels of identifiers that identify the particular that generated that request, wherein N is an integer greater than or equal to two.

* * * * *